W. SCOTT.
UNIVERSAL JOINT.
APPLICATION FILED AUG. 25, 1917.
1,261,962.
Patented Apr. 9, 1918.
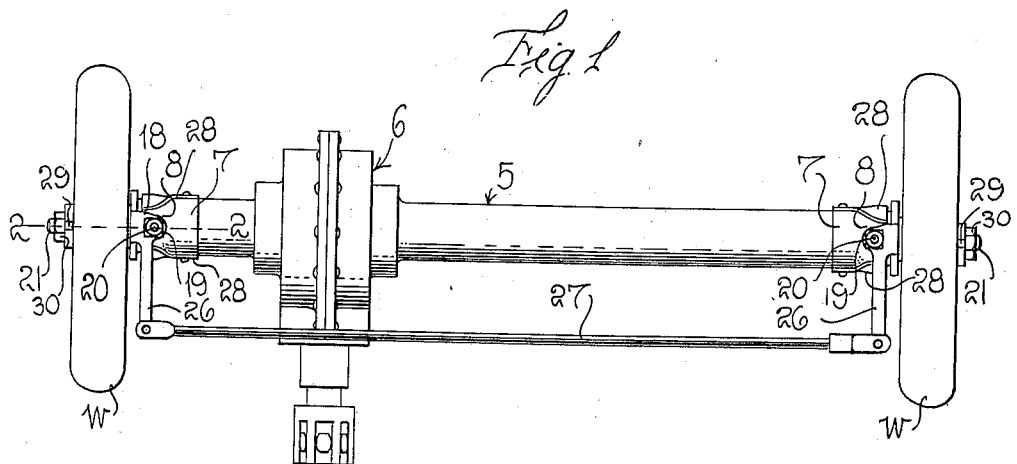
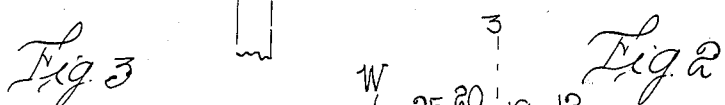
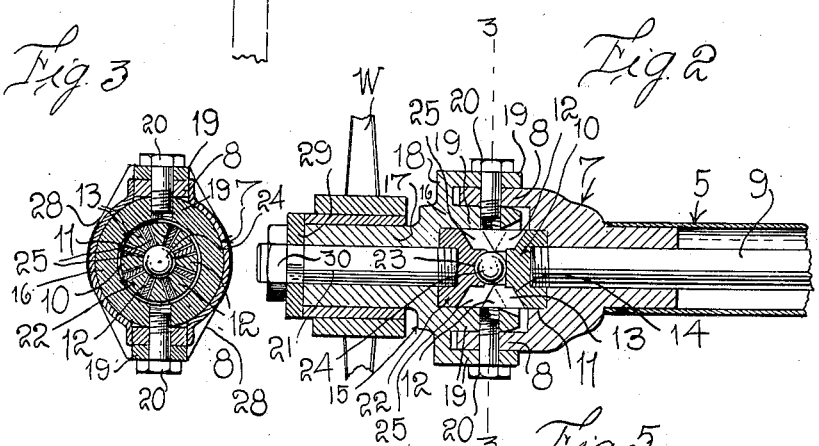
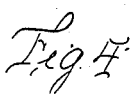
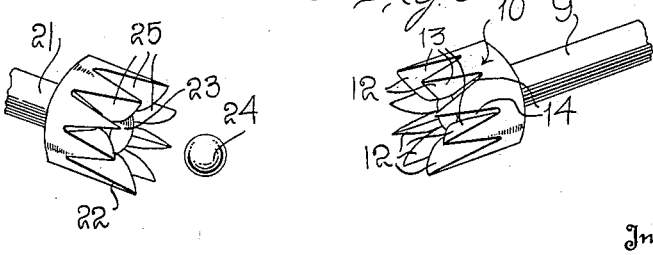
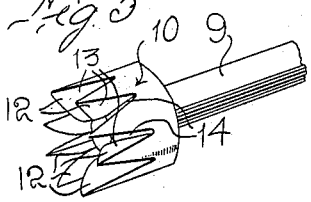
Inventor
WALTER SCOTT
By Watson E. Coleman
Attorney

UNITED STATES PATENT OFFICE.

WALTER SCOTT, OF SHERIDAN, WYOMING.

UNIVERSAL JOINT.

1,261,962.                                   Specification of Letters Patent.        Patented Apr. 9, 1918.

Application filed August 25, 1917.   Serial No. 188,235.

*To all whom it may concern:*

Be it known that I, WALTER SCOTT, a citizen of the United States, residing at Sheridan, in the county of Sheridan and State of Wyoming, have invented certain new and useful Improvements in Universal Joints, of which the following is a specification, reference being had to the accompanying drawings.

This invention relates to an improved universal joint for transmitting rotation from the driven axle to the wheel of the vehicle and has for its primary object to provide an improved power transmitting connection between the differentially driven sections of the front wheel axle and the wheel spindles regardless of the angular relation which the spindles may assume with respect to the axle in the steering of the vehicle.

It is a more particular object of the present invention to provide a driving connection between the front axle and the wheel spindle embodying co-engaging cogs on the axle and spindle having teeth of improved form, and anti-friction means interposed between the ends of the axle and spindle to prevent relative displacement of the cog gears out of coinciding axial relation with each other and thereby obviate the possible binding of the cog teeth with each other in the steering movements of the wheel spindle.

It is another object of my invention to provide a universal joint connection of such construction as to permit of the free and unretarded steering movements of the wheel spindles, the several parts of the driving connection being completely housed and protected against the entrance of grit or dust between the relatively movable elements, and the device as a whole being exceedingly simple in its construction and capable of manufacture and application to the four-wheel drive type of motor vehicle at relatively small cost.

With the above and other objects in view, my invention consists in the novel features of construction, combination, and arrangement of parts to be hereinafter more fully described, claimed, and illustrated in the accompanying drawing, in which, Figure 1 is a plan view of the front wheel axle of a motor vehicle equipped with my improved driving connection between the axle and the wheel spindles;

Fig. 2 is a section taken on the line 2—2 of Fig. 1;

Fig. 3 is a section taken on the line 3—3 of Fig. 1;

Fig. 4 is a detail perspective view of the wheel spindle and the cog gear thereon; and Fig. 5 is a similar view of the cog gear on the driving axle.

Referring in detail to the drawing, 5 designates the casing for the front wheel axle which is of the full floating type and consists of differentially driven sections which are actuated through any approved differential gearing contained within the housing indicated at 6. The axle casing 5 is provided upon each of its ends with an enlargement indicated at 7, having upper and lower laterally projecting ears 8 integrally formed therewith.

The end of the driving axle 9 has a cog gear generally indicated by the numeral 10, threaded or otherwise detachably connected thereto, the enlargement 7 of the axle casing being provided with a chamber or recess indicated at 11 to receive the inner end of this gear. The gear 10 is of peculiar construction and, as seen in Fig. 5, this gear is formed with a plurality of spaced, elongated teeth 12 of V-shaped form in plan and which extend longitudinally of the axle. The side faces of each gear tooth are chamfered or beveled, as shown at 13, said teeth at their inner edge being relatively thin. Thus, the opposed faces of adjacent gear teeth gradually diverge from their inner to their outer ends. The end of the gear body between the inner ends of the adjacent teeth is also obliquely inclined or beveled as shown at 14.

15 designates the steering knuckle which is formed with a partly-spherical wall 16 on one end of the knuckle sleeve 17. An outwardly projecting, annular flange 18 is provided at diametrically opposite sides with laterally projecting ears 19 disposed in spaced relation to the knuckle wall 16. Between these ears and the wall 16, the laterally projecting ears 8 on the end of the axle casing are adapted to engage. The wall 16 and the ears 8 and 19 are provided with coinciding openings, the ears 8 being threaded to receive the threaded shank portions of the screws indicated at 20. It will be understood that these screws are loosely engaged through the openings in the ears 19 and the wall 16 so that the knuckle 15 may have free turning movement upon the screws.

21 designates the wheel spindle which extends through the knuckle sleeve 17, and to the inner end of this wheel spindle the complementary cog gear 22 is connected. This end face of the wheel spindle is concaved as at 23, to provide a seat for a single anti-friction bearing ball 24. The gear 22 is similar in every respect with the gear 10 above described in detail, the tapering teeth 25 of the gear 22 having loose interfitting engagement between the teeth on the gear 10.

One of the ears 19 of the knuckle 16 is provided with an arm 26 to which the steering rod 27 is connected at one of its ends, the other end of the steering rod being connected to the arm of the knuckle at the opposite side of the machine. Housing plates 28 are secured to opposite sides of the enlargement 7 on the end of the axle casing between the ears 8, said plates extending exteriorly over the wall 16 of the knuckle 15. These plates effectually prevent the entrance of dust, grit, or other foreign material into the knuckle joints and afford a complete protection for the power transmitting gears.

The wheel W is provided with a hub bushing engaged upon the sleeve 17 of the knuckle 15, and this hub bushing projects beyond the end of the sleeve and is recessed at diametrically opposite points to receive radially projecting lugs on a washer plate 29 which is engaged upon the projecting end of the axle spindle. A nut 30 is threaded upon the spindle to retain the washer plate in place. Of course, it is understood that this mounting of the wheel on the axle spindle is merely illustrative and various other approved wheel mountings may be substituted therefor if desired.

From the foregoing description, taken in connection with the accompanying drawings, it will be seen that my improved driving connection between the axle and the wheel spindle afford means whereby the full power is at all times transmitted from the axle to the wheel and without in any way interfering with the proper steering movements of the front wheels of the vehicle or lessening the extent of such movements in either direction. The tapering V-shaped teeth of the cog gears afford a maximum of relative angular movement between the respective cogs, while at the same time these gear teeth are sufficiently strong and rigid to resist the bearing or breaking strains to which they may be subjected in the transmission of power from the axle to the wheel spindle. By axially positioning the single anti-friction bearing ball 24 between the opposed ends of the spindle and the wheel axle, the interfitting gear teeth are at all times maintained in proper relation with respect to the driving axles, regardless of the wear which may occur in the other bearing supports for the spindle and the axle. This is a very important feature of my invention, as it is absolutely essential that there shall be no relative axial displacement of the cogs which would result in a binding locking engagement of the cog teeth.

My improved wheel drive, as above disclosed, has given complete satisfaction in practical use and operates with a steady, even transmission of the power from the driving axle to the wheel spindle. I have above referred to a particular mounting and arrangement of the driving cog gears, but it will of course, be apparent that this mounting embodying the construction of the end of the axle casing and the steering knuckle may be modified within certain limits and various changes resorted to in the form, proportion, and relative arrangement of the several parts without departing from the essential features or sacrificing any of the advantages of the invention as claimed.

Having thus fully described my invention, what I desire to claim and secure by Letters Patent is:

1. A joint connection including in combination with a main shaft, a second shaft angularly movable out of coinciding axial relation with the first named shaft, intermeshing cog gears on the opposed ends of said shafts, one of said gears being formed with a ball seat between the inner ends of the gear teeth, and an anti-friction ball engaged upon said seat and with the center of the opposed gear, the teeth of said gears preventing the displacement of the ball in the angular movement of the gear on said second named shaft with respect to the gear on the first shaft.

2. A shaft joint including in combination with the main shaft and a second shaft angularly movable out of axial alignment with the main shaft, intermeshing cog gears removably engaged upon the opposed ends of said shafts, one of the gears being provided between the inner ends of the teeth thereon with a ball seat, and an anti-friction ball engaged on said seat and centrally contacting with the other of the gears, the gear teeth extending over and around said ball and preventing its angular displacement in the angular movement of one of the gears with respect to the other.

3. A shaft joint including in combination with the main shaft and a second shaft angularly movable out of axial alinement with said main shaft, intermeshing gears detachably threaded on the opposed ends of said shaft, one of said gears having a concaved seat, an antifriction ball engaged on said seat, the other gear having a central plane face for contact with said ball, and the teeth of the gears projecting over the ball and preventing angular displacement thereof in the angular movement of one gear with respect to the other.

In testimony whereof I hereunto affix my signature in the presence of two witnesses.

WALTER SCOTT.

Witnesses:
F. W. BYRD,
BURTON B. REED.